United States Patent
Gamage et al.

(10) Patent No.: US 12,500,832 B2
(45) Date of Patent: Dec. 16, 2025

(54) ESTABLISHING AND ADVERTISING CO-ROUTED BIDIRECTIONAL PATHS ACROSS MULTIPLE DOMAINS

(71) Applicant: Ciena Corporation, Hanover, MD (US)

(72) Inventors: Amila Pradeep Kumara Tharaperiya Gamage, Kanata (CA); Muthurajah Sivabalan, Kanata (CA)

(73) Assignee: Ciena Corporation, Hanover, MD (US)

( * ) Notice: Subject to any disclaimer, the term of this patent is extended or adjusted under 35 U.S.C. 154(b) by 302 days.

(21) Appl. No.: 18/456,716

(22) Filed: Aug. 28, 2023

(65) Prior Publication Data

US 2025/0080451 A1    Mar. 6, 2025

(51) Int. Cl.
| | |
|---|---|
| *H04L 45/02* | (2022.01) |
| *H04L 43/50* | (2022.01) |
| *H04L 45/00* | (2022.01) |
| *H04L 45/24* | (2022.01) |

(52) U.S. Cl.
CPC .............. *H04L 45/04* (2013.01); *H04L 43/50* (2013.01); *H04L 45/24* (2013.01); *H04L 45/34* (2013.01)

(58) Field of Classification Search
None
See application file for complete search history.

(56) References Cited

U.S. PATENT DOCUMENTS

| | | | |
|---|---|---|---|
| 7,031,262 B2 | 4/2006 | Vasseur et al. | |
| 7,345,994 B2 | 3/2008 | Sivabalan et al. | |
| 7,359,386 B2 | 4/2008 | Vasseur et al. | |
| 7,599,349 B2 | 10/2009 | Vasseur et al. | |
| 7,626,925 B1 | 12/2009 | Sivabalan et al. | |
| 7,648,772 B2 | 1/2010 | Sivabalan et al. | |
| 7,801,048 B1 | 9/2010 | Sivabalan et al. | |
| 7,884,351 B2 | 2/2011 | Vasseur et al. | |
| 8,004,964 B2 | 8/2011 | Boutros et al. | |
| 8,131,873 B2 | 3/2012 | Vasseur et al. | |
| 8,320,255 B2 | 11/2012 | Vasseur et al. | |
| 8,572,225 B2 | 10/2013 | Scudder et al. | |
| 8,724,454 B2 | 5/2014 | Boutros et al. | |
| 8,976,682 B2 | 3/2015 | Boutros et al. | |
| 9,013,985 B2 | 4/2015 | Sivabalan et al. | |
| 9,313,145 B2 | 4/2016 | Gandhi et al. | |

(Continued)

FOREIGN PATENT DOCUMENTS

WO    2022/161061 A1    8/2022

OTHER PUBLICATIONS

Y. Liu et al., "SR Policy for Reverse Path," Spring WG, Internet-Draft, Standards Track, Jan. 27, 2021, 6 pages.

(Continued)

*Primary Examiner* — Xavier S Wong
(74) *Attorney, Agent, or Firm* — Baratta Law PLLC; Lawrence A. Baratta, Jr.

(57) ABSTRACT

Establishing and advertising co-routed bidirectional paths across multiple domains includes determining a path from the router to a BGP peer, in a Segment Routing (SR) network, as a reverse path SR policy; appending a Binding Segment Identifier (BSID) of the reverse path SR policy in a BGP update message; and sending the BGP update message to the BGP peer. This can be used to ensure an Operations, Administration, and Maintenance (OAM) packet is guaranteed to traverse the same forward and reverse path for fault detection thereon.

20 Claims, 5 Drawing Sheets

(56) References Cited

U.S. PATENT DOCUMENTS

| | | |
|---|---|---|
| 9,369,371 B2* | 6/2016 | Filsfils .................. H04L 43/10 |
| 9,419,885 B2 | 8/2016 | Boutros et al. |
| 9,497,107 B1 | 11/2016 | Akiya et al. |
| 9,537,753 B2 | 1/2017 | Alvarez et al. |
| 9,641,416 B2 | 5/2017 | Frost et al. |
| 9,699,087 B2 | 7/2017 | Boutros et al. |
| 9,722,916 B2 | 8/2017 | Sivabalan et al. |
| 9,834,929 B2 | 12/2017 | Boutros et al. |
| 9,979,629 B2 | 5/2018 | Sivabalan et al. |
| 10,063,463 B2 | 8/2018 | Saad et al. |
| 10,158,558 B1 | 12/2018 | Ward et al. |
| 10,165,093 B2 | 12/2018 | Flisfils et al. |
| 10,250,459 B2 | 4/2019 | All et al. |
| 10,250,494 B2 | 4/2019 | Sivabalan et al. |
| 10,833,976 B2 | 11/2020 | Saad et al. |
| 10,868,755 B2 | 12/2020 | Flisfils et al. |
| 10,892,967 B2 | 1/2021 | Filsfils et al. |
| 11,411,876 B2 | 8/2022 | Tharaperiya Gamage |
| 11,483,230 B2 | 10/2022 | Filsfils et al. |
| 11,552,879 B1 | 1/2023 | Sivabalan et al. |
| 11,722,400 B2 | 8/2023 | Sivabalan et al. |
| 2015/0117222 A1 | 4/2015 | Saad et al. |
| 2016/0254994 A1 | 9/2016 | Bryant et al. |
| 2017/0026461 A1 | 1/2017 | Boutros et al. |
| 2017/0230274 A1 | 8/2017 | Flistils et al. |
| 2018/0108450 A1 | 4/2018 | Filsfils et al. |
| 2019/0297017 A1 | 9/2019 | Pignataro et al. |
| 2019/0356600 A1 | 11/2019 | Barton et al. |
| 2020/0127913 A1* | 4/2020 | Filsfils .................. H04L 45/741 |
| 2020/0153856 A1 | 5/2020 | Nainar et al. |
| 2022/0088078 A1 | 3/2022 | Sivabalan et al. |
| 2022/0124019 A1 | 4/2022 | Boutros et al. |
| 2022/0200903 A1 | 6/2022 | Boutros et al. |
| 2022/0368638 A1 | 11/2022 | Garage et al. |
| 2023/0067946 A1 | 3/2023 | Alaettinoglu et al. |
| 2023/0071325 A1 | 3/2023 | Boutros et al. |
| 2023/0073266 A1 | 3/2023 | Boutros et al. |
| 2023/0095297 A1 | 3/2023 | Alaettinoglu et al. |
| 2023/0141362 A1* | 5/2023 | Mittal .................. H04L 45/50 370/389 |
| 2023/0146226 A1 | 5/2023 | Sivabalan et al. |
| 2023/0146374 A1 | 5/2023 | Sivabalan et al. |
| 2023/0171178 A1 | 6/2023 | Gamage et al. |
| 2023/0239176 A1 | 7/2023 | Boutros et al. |
| 2023/0388177 A1* | 11/2023 | Li .................. H04L 43/0823 |
| 2024/0340236 A1* | 10/2024 | Vasudevan .............. H04L 12/66 |

OTHER PUBLICATIONS

Dec. 3, 2024, International Search Report and Written Opinion for International Patent Application No. PCT/US2024/043952.

* cited by examiner

ESTABLISHING AND ADVERTISING CO-ROUTED BIDIRECTIONAL PATHS ACROSS MULTIPLE DOMAINS

FIELD OF THE DISCLOSURE

The present disclosure relates generally to networking and computing. More particularly, the present disclosure relates to systems and methods for establishing and advertising co-routed bidirectional paths across multiple domains.

BACKGROUND OF THE DISCLOSURE

Network operators are looking for cost-effective and scalable ways to provide classic circuit services which typically are provided by Synchronous Optical Network (SONET), Synchronous Digital Hierarchy (SDH), Plesiochronous Digital Hierarchy (PDH), and the like. To provide these services by leveraging cost-effective packet switching networks, establishing bidirectional Traffic Engineered (TE) paths with similar end-to-end delays in each direction is required. One of the ways that can ensure similar end-to-end delays in each direction is to use co-routed bidirectional TE paths. Another important requirement of network operators is to steer traffic using Segment Routing (SR) policies with primary and backup SR TE paths, and switch traffic immediately to the backup path when a fault on the primary path is detected. To do this, faults on a TE path is detected using Operations, Administration, and Maintenance (OAM) mechanisms, such as, Bidirectional Forwarding Detection (BFD), Seamless BFD (S-BFD), and Performance Monitoring (PM) with liveness detection. To detect faults on a TE path, OAM mechanisms at a traffic ingress Provider Edge (PE) (i.e., headend node) periodically sends OAM packets over the path. Once these packets reach an egress PE (i.e., tail-end node), they are looped back to the ingress PE. If the ingress PE does not receive a certain number of consecutive packets (e.g., 3 packets), OAM will detect a fault on the path.

BRIEF SUMMARY OF THE DISCLOSURE

The present disclosure relates to systems and methods for establishing and advertising co-routed bidirectional paths across multiple domains. Since they are bidirectional, OAM packets could be dropped due to failures on forward TE path as well as on reverse path. Disadvantageously, OAM will trigger an unnecessary path switchover if OAM packets are dropped due to a fault on the reverse path when the reverse path is different from the forward path. To prevent this issue, forward and reverse paths should be co-routed, but this is not guaranteed. There are approaches available to steer OAM packets over the forward TE path. However, without an external controller, currently there are no approaches which could provide a co-routed reverse path Segment Identifier (SID) list to the ingress PE to steer OAM packets. The present disclosure proposes an approach to provide a co-routed reverse path SID list to the ingress PE. Moreover, the co-routed forward and reverse TE paths established with the proposed approach using the SR transport can also be used to provide circuit style services which typically are provided by SONET, SDH and PDH.

In an embodiment, a router configured as a Border Gateway Protocol (BGP) speaker includes circuitry configured to determine a path from the router to a BGP peer, in a Segment Routing (SR) network, as a reverse path SR policy, append a Binding Segment Identifier (BSID) of the reverse path SR policy in a BGP update message, and send the BGP update message to the BGP peer. The circuitry can be further configured to receive a packet including the BSID therein, and send the packet on the path based on the reverse path SR policy. The packet can be an Operations, Administration, and Maintenance (OAM) packet, which is guaranteed to traverse a same forward and reverse path for fault detection thereon. To determine the path, the circuitry can be further configured to compute a path from the BGP speaker to the BGP peer using a set of constrains for a color in color extended community. To determine the path, the circuitry can be further configured to reverse a forward path of an SR policy which is from the BGP peer to the BGP speaker that was computed using a set of constrains for a color in color extended community. The SR network can include multiple domains, and wherein the router is one of a Border Router (BR) and a Provider Edge (PE) router. The reverse path SR policy can further include one or more prefix SIDs and the path includes one or more Equal Cost Multi-Paths (ECMPs), and wherein the circuitry can be further configured to test the one or more ECMPs to validate the path.

In another embodiment, a method includes steps and a non-transitory computer-readable medium with instructions for programming circuitry associated with a router to perform the steps. The steps include determining a path from the router to a BGP peer, in a Segment Routing (SR) network, as a reverse path SR policy; appending a Binding Segment Identifier (BSID) of the reverse path SR policy in a BGP update message; and sending the BGP update message to the BGP peer. The steps can further include receiving a packet including the BSID therein; and sending the packet on the path based on the reverse path SR policy. The packet can be an Operations, Administration, and Maintenance (OAM) packet, which is guaranteed to traverse a same forward and reverse path for fault detection thereon. The determining can include computing a path from a BGP speaker to the BGP peer using a set of constrains for a color in color extended community. The determining can include reversing a forward path of an SR policy which is from the BGP peer to the BGP speaker that was computed using a set of constrains for a color in color extended community. The SR network can include multiple domains, and wherein the router is one of a Border Router (BR) and a Provider Edge (PE) router. The reverse path SR policy can further include one or more prefix SIDs and the path includes one or more Equal Cost Multi-Paths (ECMPs), and wherein the steps can further include testing the one or more ECMPs to validate the path.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
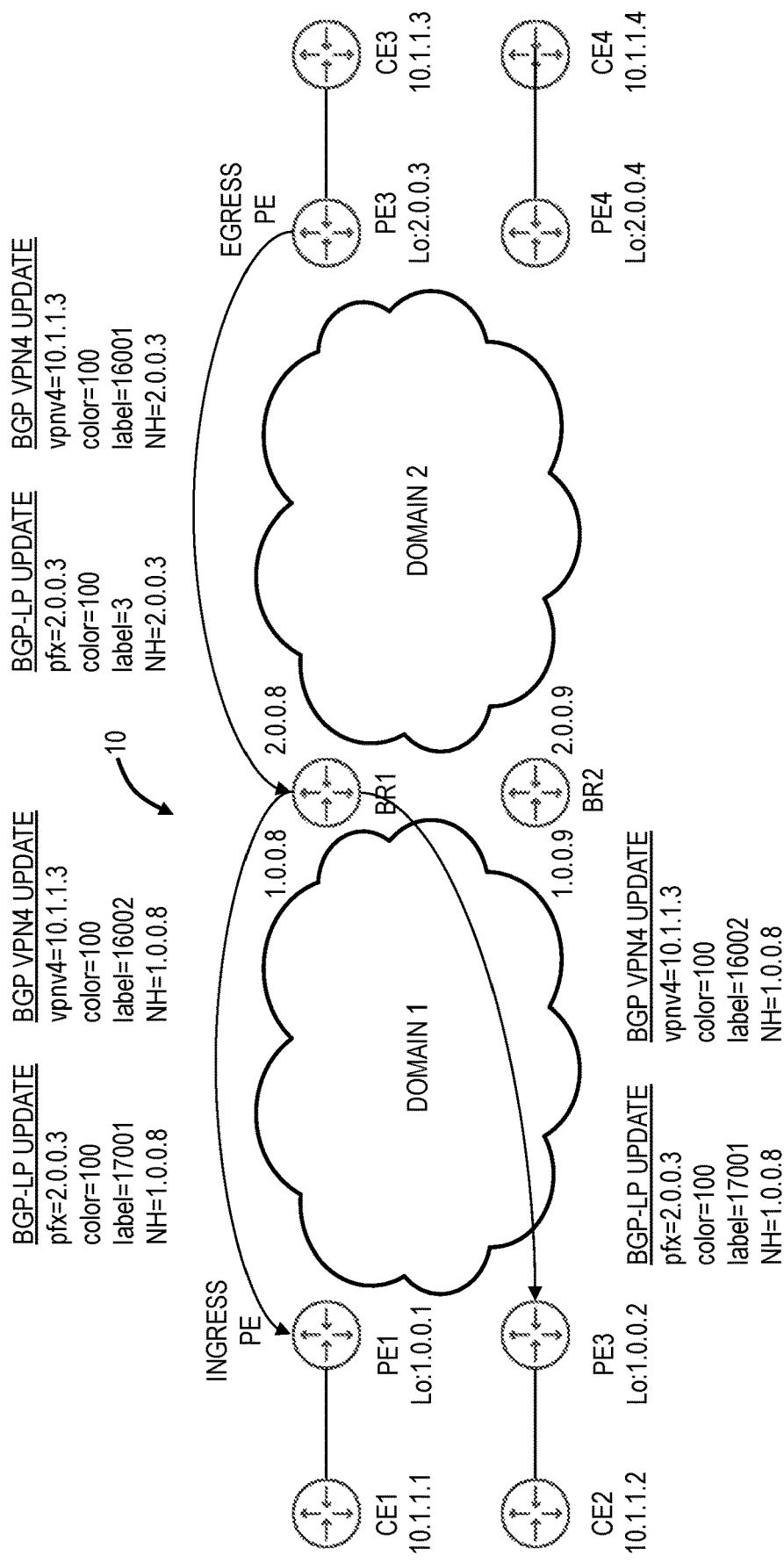
FIG. 1 is a network diagram of a multidomain network for illustrating establishing a forward TE path from a PE1 router in a domain 1 to a PE3 router in a domain 2.

Again, the present disclosure relates to systems and methods for establishing and advertising co-routed bidirectional paths across multiple domains. Specifically, the present disclosure includes:

(1) Establishing co-routed bidirectional TE paths across multiple domains in a distributed fashion.
(2) Border Gateway Protocol (BGP) speakers compute co-routed paths for reverse path SR policies and install the reverse path SR policies. For example, the path of a reverse path SR policy can be computed in two ways: (a) compute a path from the BGP speaker to BGP peer using set of constrains for color in color extended community; or (b) compute a path by reversing the path of a SR policy which is from BGP peer to BGP speaker and computed using set of constrains for the color in color extended community.
(3) A new BGP update advertises a Reverse-Label-Stack (i.e., SID list of an established co-routed reverse path) to ingress PEs. As described herein, the SID is also a label.
(4) The Reverse-Label-Stack includes binding SIDs (BSIDs) of reverse path SR policies.
(5) A Reverse-Label-Stack is created in a distributed fashion; as a BGP update propagates from an egress PE to an ingress PE, each BGP speaker along the path appends BSID of the installed reverse path SR policy to the Reverse-Label-Stack.

Advantageously, the present disclosure allows ingress PEs to avoid unnecessary path switchovers that are due to OAM (e.g., S-BFD) path down events triggered by faults on non-co-routed reverse paths.

Segment Routing Overview

A particular attraction of Segment Routing is that it obviates the need to install and maintain any end-to-end (e2e) path state in the core network. Only the ingress node for a particular flow needs to hold the segment stack, which is applied as the header of every packet of that flow, to define its route through the network. This makes Segment Routing particularly suited to control by a Software-Defined Networking (SDN) model.

Segment Routing can be directly applied to Multiprotocol Label Switching (MPLS) with no change in the forwarding plane. A segment is encoded as an MPLS label. An ordered list of segments is encoded as a stack of labels. The segment to process is on the top of the stack. Upon completion of a segment, the related label is popped from the stack. Segment Routing can also be applied to the Internet Protocol (IP) v6 architecture, with a new type of routing extension header—for example, the document published in July 2015 as draft-previdi-6man-segment-routing-header (available online at tools.ietf.org/html/draft-previdi-6man-segment-routing-header-08) and RFC 8754, "IPv6 Segment Routing Header (SRH)," March 2020, the contents of both are incorporated by reference. A segment is encoded as an IPv6 address. An ordered list of segments is encoded as an ordered list of IPv6 addresses in the routing extension header. The Segment to process at any point along the path through the network is indicated by a pointer in the routing extension header. Upon completion of a segment, the pointer is incremented. Segment Routing can also be applied to Ethernet, e.g., IEEE 802.1 and variants thereof. There are various benefits asserted for SR, including, for example, scalable end-to-end policy, easy incorporation in IP and SDN architectures, operational simplicity, a balance between distributed intelligence, centralized optimization, and application-based policy creation, and the like.

In loose source routing such as Segment Routing, a source node chooses a path or is provided a path by a Software Defined Networking (SDN) controller or Path Computation Element (PCE) and encodes the chosen path in a packet header as an ordered list of segments. The rest of the network executes the encoded instructions without any further per-flow state. Segment Routing provides full control over the path without the dependency on network state or signaling to set up a path. This makes Segment Routing scalable and straightforward to deploy. Segment Routing (SR) natively supports both IPv6 (SRv6) and MPLS (SR-MPLS) forwarding planes and can co-exist with other transport technologies, e.g., Resource Reservation Protocol (RSVP)-Traffic Engineering (RSVP-TE) and Label Distribution Protocol (LDP).

In Segment Routing, a path includes segments which are instructions a node executes on an incoming packet. For example, segments can include forward the packet according to the shortest path to the destination, forward through a specific interface, or deliver the packet to a given application/service instance). Each Segment is represented by a Segment Identifier (SID). All SIDs are allocated from a Segment Routing Global Block (SRGB) with domain-wide scope and significance, or from a Segment Routing Local Block (SRLB) with local scope. The SRGB includes the set of global segments in the SR domain. If a node participates in multiple SR domains, there is one SRGB for each SR domain. In SRv6, the SRGB is the set of global SRv6 SIDs in the SR domain.

A segment routed path is encoded into the packet by building a SID stack that is added to the packet. These SIDs are popped by processing nodes, and the next SID is used to decide forwarding decisions. A SID can be one of the following types an adjacency SID, a prefix SID, a node SID, a binding SID, and an anycast SID. Each SID represents an associated segment, e.g., an adjacency segment, a prefix segment, a node segment, a binding segment, and an anycast segment.

An adjacency segment is a single-hop, i.e., a specific link. A prefix segment is a multi-hop tunnel that can use equal-cost multi-hop aware shortest path links to reach a prefix. A prefix SID can be associated with an IP prefix. The prefix SID can be manually configured from the SRGB and can be distributed by Open Shortest Path First (OSPF) or Intermediate System-Intermediate System (ISIS). The prefix segment steers the traffic along the shortest path to its destination. A node SID is a special type of prefix SID that identifies a specific node. It is configured under the loopback interface with the loopback address of the node as the prefix. A prefix segment is a global segment, so a prefix SID is globally unique within the segment routing domain. An adjacency segment is identified by a label called an adjacency SID, which represents a specific adjacency, such as egress interface, to a neighboring router. The adjacency SID is distributed by ISIS or OSPF. The adjacency segment steers the traffic to a specific adjacency.

A binding segment represents an SR policy. A head-end node of the SR policy binds a Binding SID (BSID) to its policy. When the head-end node receives a packet with an active segment matching the BSID of a local SR Policy, the head-end node steers the packet into the associated SR Policy. The BSID provides greater scalability, network opacity, and service independence. Instantiation of the SR Policy may involve a list of SIDs. Any packets received with an active segment equal to BSID are steered onto the bound SR Policy. The use of a BSID allows the instantiation of the policy (the SID list) to be stored only on the node or nodes that need to impose the policy. The direction of traffic to a node supporting the policy then only requires the imposition of the BSID. If the policy changes, this also means that only the nodes imposing the policy need to be updated. Users of the policy are not impacted. The BSID can be allocated from the local or global domain. It is of special significance at the head-end node where the policy is programmed in forwarding.

SR Traffic Engineering (SR-TE) provides a mechanism that allows a flow to be restricted to a specific topological path, while maintaining per-flow state only at the ingress node(s) to the SR-TE path. It uses the Constrained Shortest Path First (CSPF) algorithm to compute paths subject to one or more constraint(s) (e.g., link affinity) and an optimization criterion (e.g., link latency). An SR-TE path can be computed by a head-end of the path whenever possible (e.g., when paths are confined to single IGP area/level) or at a PCE (e.g., when paths span across multiple IGP areas/levels).

BGP and BGP Color-Aware Routing (CAR)

BGP is a gateway protocol that enables the networks including multidomain networks to exchange routing information between and within one another. BGP uses the concept of autonomous systems (AS). An autonomous system is a group of networks under a common administration. Autonomous systems can run Interior Gateway Protocols (IGP) within the system and an Exterior Gateway Protocol (EGP) between them, such as BGPv4. For example, see RFC 4271, "A Border Gateway Protocol 4 (BGP-4), January 2006, the contents of which are incorporated by reference. Also, those skilled in the art will appreciate there are various other RFCs defining aspects of BGP, all of which incorporated by reference herein. A BGP speaker is a term used to refer to a device, e.g., router, that is configured to advertise routing information in BGP. Conversely, a BGP peer is communicatively coupled to the BGP speaker and configured to receive the advertised routing information in BGP.

With BGP, in multidomain networks, each domain shares its routing information, but each domain makes routing decisions internally on its own. As described herein, there is no guarantee a bidirectional path from an ingress PE in one domain to an egress domain in another domain follows the same path in the forward and reverse direction. BGP Color-Aware Routing (CAR) can establish multidomain TE paths in the direction of traffic (i.e., forward TE path). BGP CAR is described in the IETF draft-dskc-bess-bgp-car-05, Jul. 28, 2022, the contents of which are incorporated by reference in their entirety. Color is a standard way to signal intent, e.g., color can be represented by a number. For example, RFC 4360, "BGP Extended Communities Attribute," February 2006, the contents of which are incorporated by reference, the color can be in the extended community.

A colored service route is one requesting a particular intent, and a color-aware transport route is one that satisfies a particular intent, such that a colored service route is steered over a color-aware route of the same intent. In BGP CAR, the color can be used across domains, to provide multidomain TE paths in the direction of traffic. However, BGP CAR does not provide a mechanism to establish or advertise a co-routed reverse path across multiple domains. As described herein, for OAM applications (e.g., S-BFD), establishing and advertising co-routed reverse paths are essential.

BGP Labeled Unicast

BGP Labeled Unicast (BGP LU) is described, e.g., in RFC 3107, "Carrying Label Information in BGP-4," January 2001, the contents of which are incorporated by reference herein. BGP LU specifies a way in which the label mapping information for a particular route is piggybacked in the same BGP Update message that is used to distribute the route itself. Specifically, piggybacked means a label associated with the route is included in the BGP update message. Note, RFC 3107 focuses on Multiprotocol Label Switching (MPLS) labels, but can equally apply to SIDs in Segment Routing.

Establishing a Forward TE Path

FIG. 1 is a network diagram of a multidomain network 10 for illustrating establishing a forward TE path from a PE1 router in a domain 1 to a PE3 router in a domain 2. The network 10 includes Customer Edge (CE) routers CE1, CE2, CE3, CE4, PE routers PE1, PE2, PE3, PE4, and Border Routers (BR) BR1, BR2. Specifically, the CE routers CE 1, CE2 and the PE routers PE1, PE2 are in the domain 1, and the CE routers CE3, CE4 and the PE routers PE3, PE4 are in the domain 2. The BR routers BR1, BR2 are located in both of the domains 1, 2. Those skilled in the art will recognize there can be additional routers and the like in the network 10, which are omitted for simplicity of illustration. Further, the network 10 is illustrated with two domains 1, 2, and those skilled in the art will recognize there can be additional domains, which are omitted for simplicity of illustration.

In the example of FIG. 1, traffic flows from left to right, and FIG. 1 illustrates BGP Labeled Unicast (BGP LU) and Virtual Private Network version 4 (VPNv4) updates from the PE3 router (egress PE) to the PE1 router (ingress PE) via the BR1 router. Also, the various routers in FIG. 1 are listed with corresponding Internet Protocol (IP) addresses. In the multidomain network 10, the border routers BR1, BR2 could be an Autonomous System BR (ASBR) or inline Route Reflectors (RR).

The following describes an example approach to establish a forward TE path from the PE1 router in the domain 1 to the PE3 router in the domain 2. In this example, the PE1 router is the ingress PE and the PE3 router is egress PE, meaning traffic is flowing from left to right. Of course, other embodiments are contemplated.

The PE3 router advertises a VPNv4 prefix 10.1.1.3 with a BGP color extended community value of 100, to the PE1 router and the PE2 router, via the BR1 router; where the PE3 router is traffic egress, and the PE1 router and the PE2 router are traffic ingresses. When the BR1 router and the PE1 router receive BGP LU and VPNv4 updates with color 100, they instantiate color 100 SR policies (if not available already) to BGP next hops in the BGP updates, based on the set of constraints for color 100. At the BR1 router, BGP LU label 17001 will be pointed to an SR policy with the destination of the PE3 router in the domain 2.

To steer packets (e.g., OAM packets) from the PE1 router to the PE3 router over the forward TE path, packets will have a forward SID list which includes
  (1) SID list of color 100 SR policy to the BR1 router, and
  (2) BGP LU label received by the PE1 router for the Originator ID of the BGP VPNv4 update the PE1 router received (17001 in this example).

Alternatively, the same could be achieved by sending the packets with a BGP LU label at the PE1 router for Originator ID of the BGP VPNv4 update received by the PE1 router.

As such, the color 100 allows the PE1 router to steer a packet in the forward direction to the PE3 router in the domain 2. That is, the label 17001 has the color 100 intent which is enforced on the forward path in the domain 2.

Establish and Advertise Co-Routed Reverse Path

The above allows the PE1 router to steer packets on a defined path to the PE3 router in the domain 2. However, as described herein, there is no guarantee a looped back packet from the PE3 router will traverse the same defined path on its return to the PE1 router. Again, as described herein, this is particularly a problem for OAM packets which are needed to detect faults. That is, having an OAM packet steered in the forward direction can be used to detect a fault on a forward path, but if the return OAM packet traverses a different path, there is a problem if this return path has a fault whereas the forward path does not.

Figure 2:
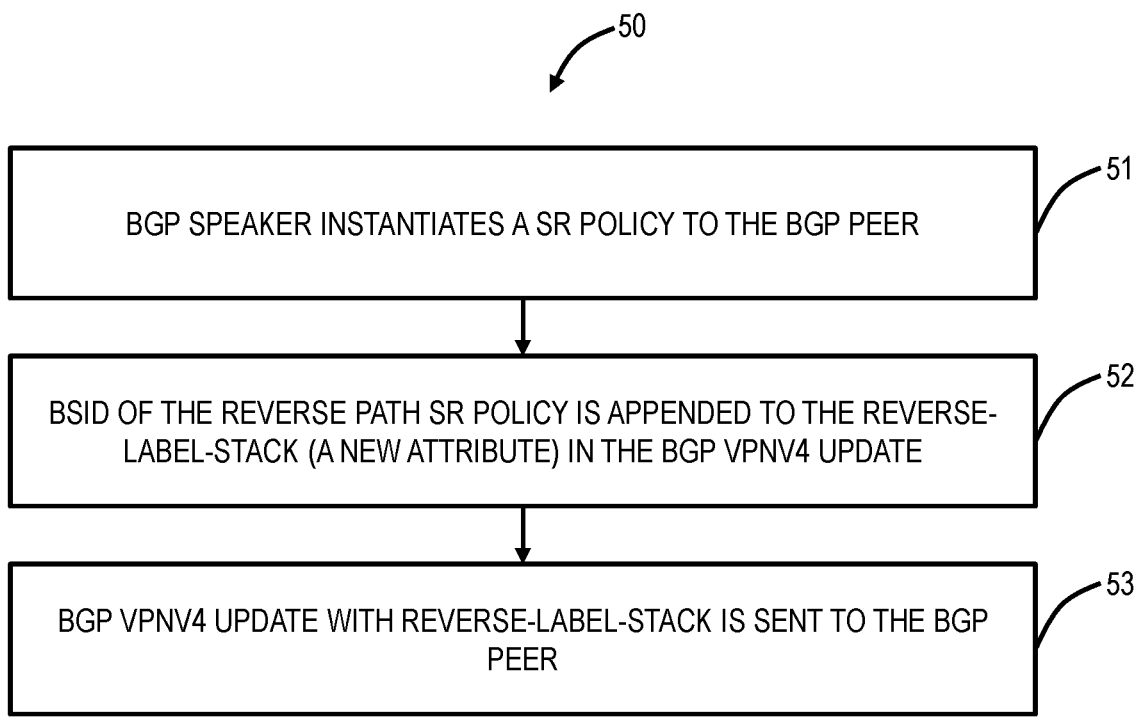
FIG. 2 is a flowchart of a process for establishing and advertising a co-routed reverse path.

FIG. 2 is a flowchart of a process 50 for establishing and advertising a co-routed reverse path. The process 50 contemplates implementation as a method having steps, via any of the PE or BR routers or BGP speakers configured to implement the steps, via circuitry configured to implement the steps, and as non-transitory computer-readable medium storing instructions that, when executed, program one or more processors or circuitry to implement the steps. The process 50 enables a BGP speaker (e.g., the PE3 router or the BR1 router in the network 10) to send a BGP VPNv4 update with a color extended community to a BGP peer (e.g., the BR1 router or PE1/PE2 routers, respectively, in the network 10).

The process 50 includes:

Step 51: the BGP speaker instantiates a SR policy to the BGP peer. This SR policy can be referred to as reverse path SR policy. A path of a reverse path SR policy can be computed in two ways: (1) compute a path from the speaker to the peer using the set of constrains for color in the color extended community; or (2) compute a path by reversing the path of a SR policy which is from the peer to the speaker and computed using set of constrains for the color in color extended community. The later approach guarantees use of the same set of links for forward and reverse paths.

Step 52: BSID of the reverse path SR policy is appended to the Reverse-Label-Stack (a new attribute) in the BGP VPNv4 update.

Step 53: BGP VPNv4 update with Reverse-Label-Stack is sent to the BGP peer.

When an ingress PE receives a BGP VPNv4 update with a Reverse-Label-Stack, it can use the reverse label stack to steer packets (e.g., OAM) from the egress PE back to the ingress PE on a path that is co-routed with the forward TE path. Furthermore, the reverse path SR policies created can also be used as forward path SR policies in the other direction.

Figure 3:
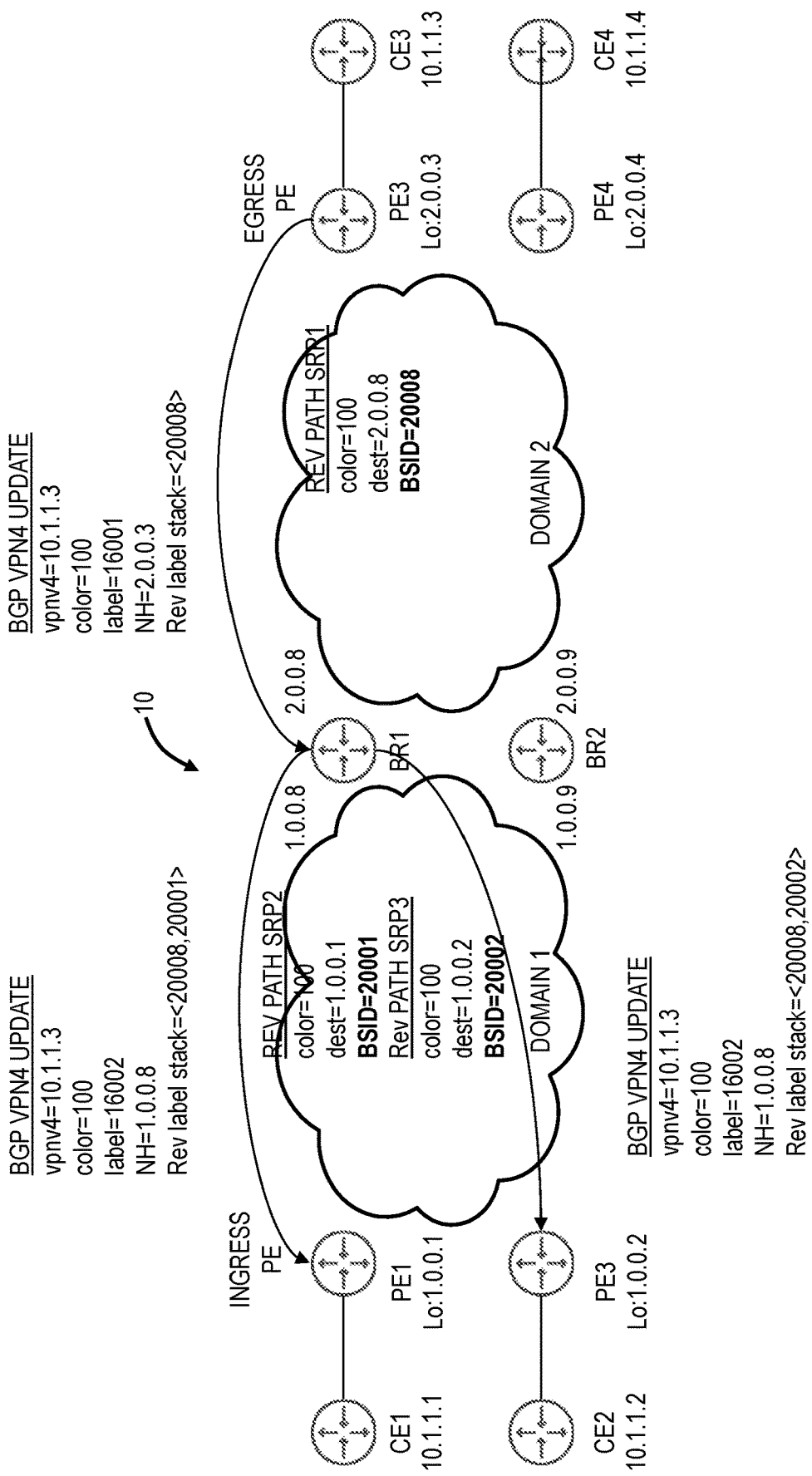
FIG. 3 is a network diagram of the multidomain network of FIG. 1 for illustrating establishing a reverse TE path from the PE3 router in the domain 2 to the PE1 router in the domain 1.

FIG. 3 is a network diagram of the multidomain network 10 for illustrating establishing a reverse TE path from the PE3 router in the domain 2 to the PE1 router in the domain 1. In the example of FIG. 3, the process 50 is illustrated to instantiate reverse path SR policies at the PE3 router and the BR1 router. The reverse path label stack sent by the PE3 includes an SR policy BSID 20008, while that sent by the BR1 router includes an SR policy BSID's 20008 and 20001. In this example, to steer packets over co-routed forward and reverse paths, the packets will contain the forward SID list and a reverse label stack of <20008, 20001>.

The process 50 contemplates use with or without the establishing a forward TE path described above. For example, it is possible to forgo computing the forward TE path and simply compute the reverse path from the BGP speaker to the BGP peer using a set of constrains for a color in color extended community. If the BGP speaker has receive the computed forward TE path, the reverse path can be determined based thereon by reversing a forward path of an SR policy which is from the BGP peer to the BGP speaker that was computed using a set of constrains for a color in color extended community.

Handling of ECMPs in the Proposed Method

When an SR policy candidate path SID list contains one or more prefix SIDs, the path could contain Equal Cost Multi-Paths (ECMPs). ECMP is a network routing strategy that enables packets of traffic to transmit across multiple best paths with equal cost. Since customer traffic could be hashed to any of these ECMPs, the entire candidate path is invalidated when any of the ECMPs has a fault. Therefore, to validate the candidate path SID list, all ECMPs on the forward path should be tested by sending OAM (e.g., BFD and PM liveness) packets. ECMPs on the reverse path do not have to be tested; the only requirement is to steer the OAM packets via a reverse path that shares links/nodes with one or more of the forward path ECMPs, so that the faults (if any) on the reverse path are also on the forward path ECMPs.

The following known can be used herein for testing ECMPs:

(1) Source address sweeping: This technique sends multiple OAM packets with the same SID list, but with different source IP address so that the packets will be hashed to different ECMPs. Failing to receive N number of packets with the same source address would indicate an issue with an ECMP, and will make the associated candidate path of the SR policy invalid to forward customer traffic. Instead of source address, other parameters of the packet (e.g., flow label) can be modified to achieve the same result as well.

(2) Wildcard flow label method, e.g., described in U.S. Patent Application No. 20230171178, filed Nov. 20, 2021, and entitled "Systems and methods for data plane validation of multiple paths in a network," the contents of which are incorporated by reference herein. In this approach, when a node receives a packet, if the top SID has multiple ECMP next hops, the packet will be replicated and forwarded to all the ECMP next hops. When the packet is forwarded, some information about ECMPs is encoded in the flow label or a similar parameter so that headend node can identify if any ECMP has a fault.

(3) Circuit style SR policies: One of the constraints associated with BGP color can indicate to use circuit style SR policies. These policies use adjacency SIDs to pin down the path without ECMP's. Hence, testing ECMPs is not required.

Process

Figure 4:
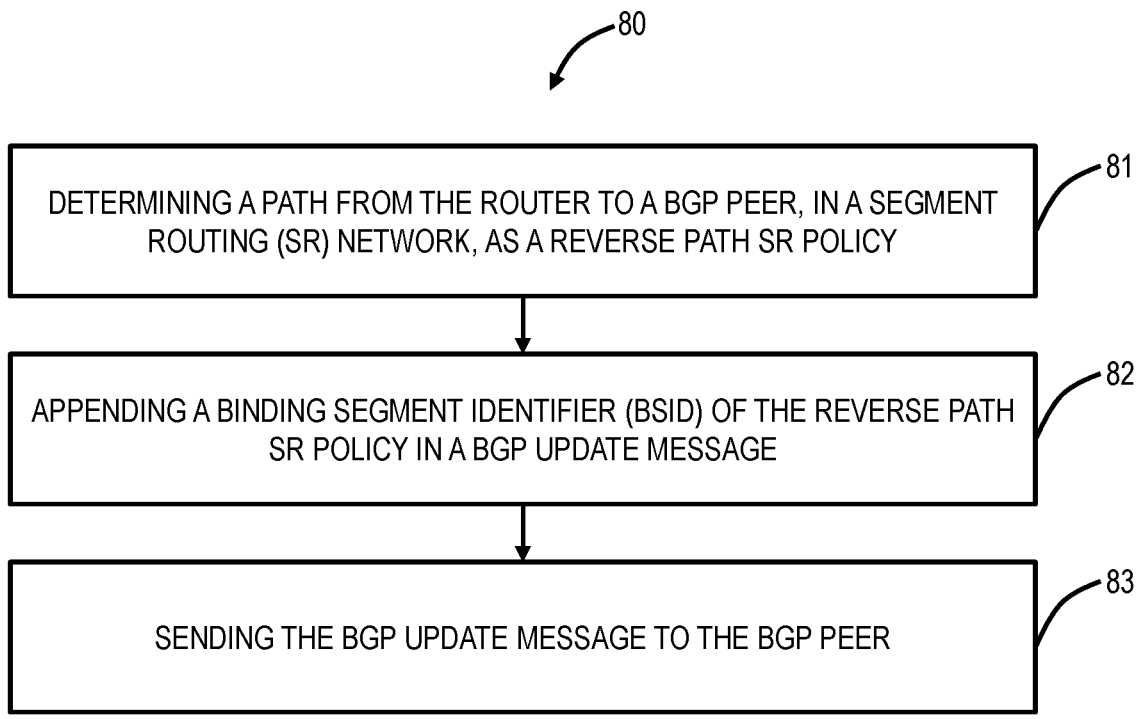
FIG. 4 is a flowchart of a process for establishing and advertising co-routed bidirectional paths across multiple domains.

FIG. 4 is a flowchart of a process 80 for establishing and advertising co-routed bidirectional paths across multiple domains. The process 80 contemplates implementation as a method having steps, via any of the PE or BR routers or BGP speakers configured to implement the steps, via circuitry configured to implement the steps, and as non-transitory computer-readable medium storing instructions that, when executed, program one or more processors or circuitry to implement the steps.

The process 80 includes, at Step 81, determining a path from the router to a BGP peer, in a Segment Routing (SR) network, as a reverse path SR policy; at Step 82, appending a Binding Segment Identifier (BSID) of the reverse path SR policy in a BGP update message; and, at Step 83, sending the BGP update message to the BGP peer. The process 80 can further include receiving a packet including the BSID therein; and sending the packet on the path based on the reverse path SR policy. The packet can be an Operations, Administration, and Maintenance (OAM) packet, which is guaranteed to traverse a same forward and reverse path for fault detection thereon.

The determining can include computing a path from the BGP speaker to the BGP peer using a set of constrains for a color in color extended community. The determining can also include reversing a forward path of an SR policy which is from the BGP peer to the BGP speaker that was computed using a set of constrains for a color in color extended community. That is, the techniques described herein are not necessary in multidomain networks having unified control, such as via a Path Computation Engine (PCE) or Software Defined Networking (SDN) controller, as the unified control would have visibility across the multiple domains and can properly causing packet steering.

The SR network can include multiple domains, and wherein the router is one of a Border Router (BR) and a Provider Edge (PE) router. The reverse path SR policy can further include one or more prefix SIDs and the path includes one or more Equal Cost Multi-Paths (ECMPs), and wherein the process 80 can further include testing the one or more ECMPs to validate the path.

Example Node

Figure 5:
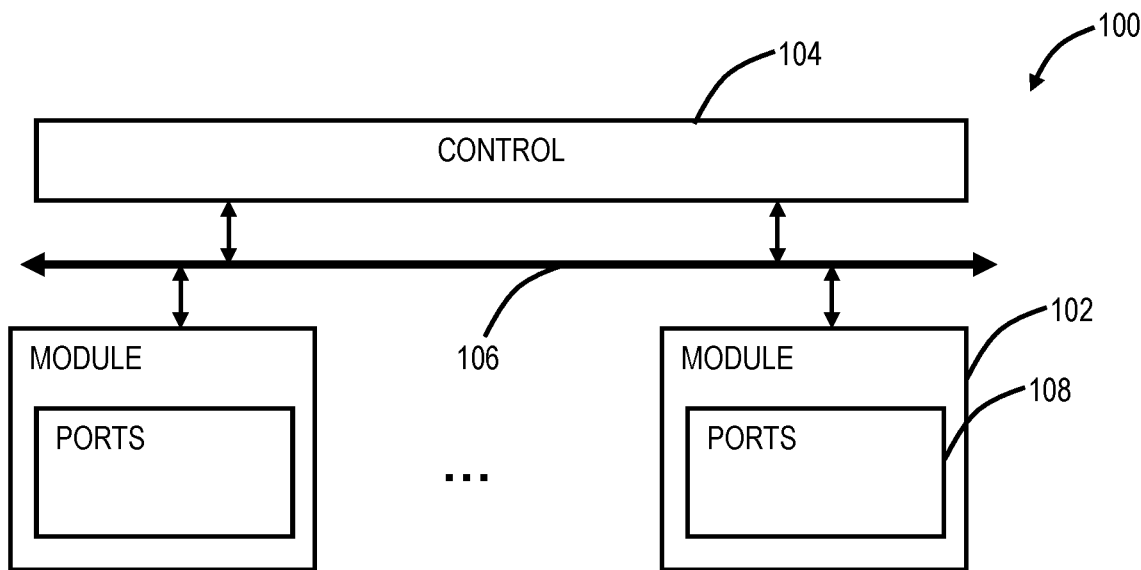
FIG. 5 is a block diagram of an example implementation of a router, such as forming any of the CE, PE, or BR routers described herein.

FIG. 5 is a block diagram of an example implementation of a router 100, such as forming any of the CE, PE, or BR routers described herein. Those of ordinary skill in the art will recognize FIG. 5 is a functional diagram in an over-simplified manner, and a practical embodiment may include additional components and suitably configured processing logic to support known or conventional operating features that are not described in detail herein.

In an embodiment, the router 100 includes a plurality of modules 102, 104 interconnected via an interface 106. The modules 102, 104 are also known as blades, line cards, line modules, circuit packs, pluggable modules, etc. and generally refer to components mounted on a chassis, shelf, etc. of a data switching device, i.e., the router 100. Each of the modules 102, 104 can include numerous electronic devices and/or optical devices mounted on a circuit board along with various interconnects, including interfaces to the chassis, shelf, etc.

Two example modules are illustrated with line modules 102 and a control module 104. The line modules 102 include ports 108, such as a plurality of Ethernet ports. For example, the line module 102 can include a plurality of physical ports disposed on an exterior of the module 102 for receiving ingress/egress connections. Additionally, the line modules 102 can include switching components to form a switching fabric via the interface 106 between all of the ports 108, allowing data traffic to be switched/forwarded between the ports 108 on the various line modules 102. The switching fabric is a combination of hardware, software, firmware, etc. that moves data coming into the router 100 out by the correct port 108 to the next router 100. "Switching fabric" includes switching/routing units in a node; integrated circuits contained in the switching units; and programming that allows switching paths to be controlled. Note, the switching fabric can be distributed on the modules 102, 104, in a separate module (not shown), integrated on the line module 102, or a combination thereof.

The control module 104 can include a microprocessor, memory, software, and a network interface. Specifically, the microprocessor, the memory, and the software can collectively control, configure, provision, monitor, etc. the router 100. The network interface may be utilized to communicate with an element manager, a network management system, etc. Additionally, the control module 104 can include a database that tracks and maintains provisioning, configuration, operational data, and the like.

Again, those of ordinary skill in the art will recognize the router 100 can include other components which are omitted for illustration purposes, and that the systems and methods described herein are contemplated for use with a plurality of different network elements with the router 100 presented as an example type of network element. For example, in another embodiment, the router 100 may include corresponding functionality in a distributed fashion. In a further embodiment, the chassis and modules may be a single integrated unit, namely a rack-mounted shelf where the functionality of the modules 102, 104 is built-in, i.e., a "pizza-box" configuration. That is, FIG. 5 is meant to provide a functional view, and those of ordinary skill in the art will recognize actual hardware implementations may vary; all of which are contemplated herewith.

Example Processing Device

Figure 6:
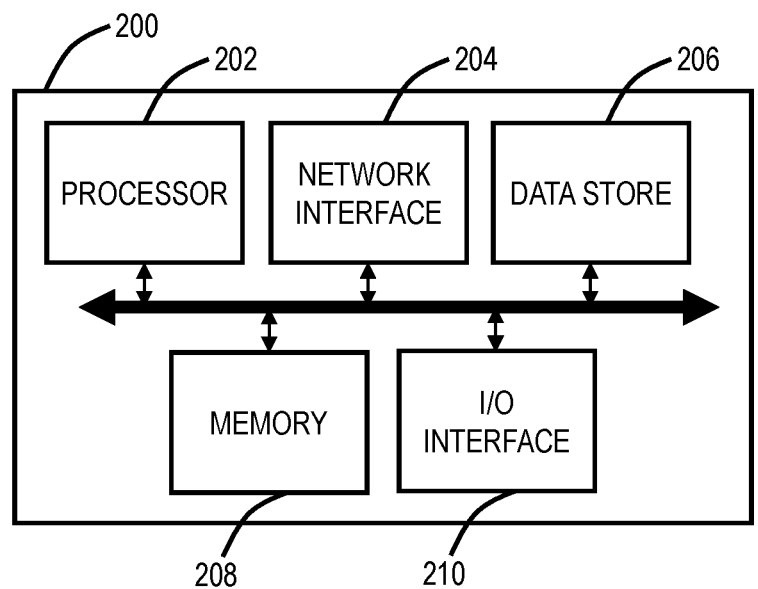
FIG. 6 is a block diagram of an example processing device.

FIG. 6 is a block diagram of an example processing device 200. The processing device 200 can be part of the router 100. Also, the processing device 200 can be referred to in implementations as a control module, a shelf controller, a shelf processor, a system controller, etc. The processing device 200 can include a processor 202 which is a hardware device for executing software instructions. The processor 202 can be any custom made or commercially available processor, a central processing unit (CPU), an auxiliary processor among several processors associated with the processing device 200, a semiconductor-based microprocessor (in the form of a microchip or chipset), or generally any device for executing software instructions. When the processing device 200 is in operation, the processor 202 is configured to execute software stored within the memory, to communicate data to and from the memory, and to generally control operations of the processing device 200 pursuant to the software instructions. The processing device 200 can also include a network interface 204, a data store 206, memory 208, an I/O interface 210, and the like, all of which are communicatively coupled to one another and to the processor 202.

The network interface 204 can be used to enable the processing device 200 to communicate on a data communication network, such as to communicate to a management system, or the like. The network interface 204 can include, for example, an Ethernet module. The network interface 204 can include address, control, and/or data connections to enable appropriate communications on the network. The data store 206 can be used to store data, such as control plane information, provisioning data, Operations, Administration, Maintenance, and Provisioning (OAM&P) data, etc. The data store 206 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof.

Moreover, the data store 206 can incorporate electronic, magnetic, optical, and/or other types of storage media. The memory 208 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 208 may incorporate electronic, magnetic, optical, and/or other types of storage media. Note that the memory 208 can have a distributed architecture, where various components are situated remotely from one another, but may be accessed by the processor 202. The I/O interface 210 includes components for the processing device 200 to communicate with other devices.

CONCLUSION

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Further, the various elements, operations, steps, methods, processes, algorithms, functions, techniques, modules, circuits, etc. described herein contemplate use in any and all combinations with one another, including individually as well as combinations of less than all of the various elements, operations, steps, methods, processes, algorithms, functions, techniques, modules, circuits, etc.

What is claimed is:

1. A router configured as a Border Gateway Protocol (BGP) speaker, the router comprising circuitry configured to:
   determine a path from the router to a BGP peer, in a Segment Routing (SR) network, as a reverse path SR policy,
   append a Binding Segment Identifier (BSID) of the reverse path SR policy to a Reverse-Label-Stack attribute of a BGP update message, wherein the append of the BSID contributes to construction of the Reverse-Label-Stack in a distributed manner as the BGP update message propagates, the construction involving each BGP speaker along the path appending a BSID of its installed reverse path SR policy, and
   send the BGP update message to the BGP peer.

2. The router of claim 1, wherein the circuitry is further configured to
   receive a packet having, as an active segment, the BSID from the Reverse-Label Stack, and
   send the packet on the path based on the reverse path SR policy.

3. The router of claim 2, wherein the packet is an Operations, Administration, and Maintenance (OAM) packet including Bidirectional Forwarding Detection (BFD) or Seamless BFD (S-BFD) information, which is guaranteed to traverse a same forward and reverse path for fault detection by virtue of the co-routed reverse-path SR policy advertised in the BGP update message.

4. The router of claim 1, wherein, to determine the path, the circuitry is further configured to
   compute a path from the BGP speaker to the BGP peer using a set of constraints for a color in a BGP color extended community.

5. The router of claim 1, wherein, to determine the path, the circuitry is further configured to
   reverse a forward path of an SR policy which is from the BGP peer to the BGP speaker that was computed using a set of constrains for a color in a BGP color extended community.

6. The router of claim 1, wherein the SR network includes multiple domains, and wherein the router is one of a Border Router (BR) and a Provider Edge (PE) router.

7. The router of claim 1, wherein the reverse path SR policy further includes one or more prefix Segment Identifiers SIDs and the path includes one or more Equal Cost Multi-Paths (ECMPs), and wherein the circuitry is further configured to
   test the one or more ECMPs to validate the path.

8. A non-transitory computer-readable medium comprising instructions for programming circuitry associated with a router to perform steps of:
   determining a path from the router to a BGP peer, in a Segment Routing (SR) network, as a reverse path SR policy;
   appending a Binding Segment Identifier (BSID) of the reverse path SR policy to a Reverse-Label-Stack attribute of a BGP update message, wherein the appending of the BSID contributes to construction of the Reverse- Label-Stack in a distributed manner as the BGP update message propagates, the construction involving each BGP speaker along the path appending a BSID of its installed reverse path SR policy; and sending the BGP update message to the BGP peer.

9. The non-transitory computer-readable medium of claim 8, wherein the steps further include receiving a packet having, as an active segment, the BSID from the Reverse-Label Stack; and sending the packet on the path based on the reverse path SR policy.

10. The non-transitory computer-readable medium of claim 9, wherein the packet is an Operations, Administration, and Maintenance (OAM) packet including Bidirectional Forwarding Detection (BFD) or Seamless BFD (S-BFD) information, which is guaranteed to traverse a same forward and reverse path for fault detection by virtue of the co-routed reverse-path SR policy advertised in the BGP update message.

11. The non-transitory computer-readable medium of claim 8, wherein the determining includes computing a path from a BGP speaker to the BGP peer using a set of constraints for a color in a BGP color extended community.

12. The non-transitory computer-readable medium of claim 8, wherein the determining includes reversing a forward path of an SR policy which is from the BGP peer to the BGP speaker that was computed using a set of constraint for a color in a BGP color extended community.

13. The non-transitory computer-readable medium claim 8, wherein the SR network includes multiple domains, and wherein the router is one of a Border Router (BR) and a Provider Edge (PE) router.

14. The non-transitory computer-readable medium of claim 8, wherein the reverse path SR policy further includes one or more prefix Segment Identifiers SIDs and the path includes one or more Equal Cost Multi-Paths (ECMPs), and wherein the steps further include testing the one or more ECMPs to validate the path.

15. A method comprising steps of:

determining a path from a router to a BGP peer, in a Segment Routing (SR) network, as a reverse path SR policy;

appending a Binding Segment Identifier (BSID) of the reverse path SR policy to a Reverse-Label-Stack attribute of a BGP update message, wherein the appending of the BSID contributes to construction of the Reverse-Label-Stack in a distributed manner as the BGP update message propagates, the construction involving each BGP speaker along the path appending a BSID of its installed reverse path SR policy; and sending the BGP update message to the BGP peer.

16. The method of claim 15, wherein the steps further include receiving a packet having, as an active segment, the BSID from the Reverse-Label Stack; and sending the packet on the path based on the reverse path SR policy.

17. The method of claim 16, wherein the packet is an Operations, Administration, and Maintenance (OAM) packet including Bidirectional Forwarding Detection (BFD) or Seamless BFD (S-BFD) information, which is guaranteed to traverse a same forward and reverse path for fault detection by virtue of the co-routed reverse-path SR policy advertised in the BGP update message.

18. The method of claim 15, wherein the determining includes computing a path from a BGP speaker to the BGP peer using a set of constraints for a color in a BGP color extended community.

19. The method of claim 15, wherein the determining includes reversing a forward path of an SR policy which is from the BGP peer to the BGP speaker that was computed using a set of constraints for a color in a BGP color extended community.

20. The method of claim 15, wherein the SR network includes multiple domains, and wherein the router is one of a Border Router (BR) and a Provider Edge (PE) router.

* * * * *